United States Patent
Ito et al.

(10) Patent No.: US 9,963,083 B2
(45) Date of Patent: May 8, 2018

(54) VEHICLE LOUDSPEAKER SYSTEM

(71) Applicants: Alpine Electronics, Inc., Shinagawa-ku, Tokyo (JP); Blueprint Acoustics Pty Ltd., Endeavour Hills, Victoria (AU)

(72) Inventors: Ryo Ito, Iwaki (JP); Arata Tada, Iwaki (JP); Keita Tanno, Iwaki (JP)

(73) Assignees: Alpine Electronics, Inc., Tokyo (JP); Blueprint Acoustics Pty Ltd., Endeabour Hills (AU)

( * ) Notice: Subject to any disclaimer, the term of this patent is extended or adjusted under 35 U.S.C. 154(b) by 0 days. days.

(21) Appl. No.: 15/602,963

(22) Filed: May 23, 2017

(65) Prior Publication Data

US 2017/0341592 A1 Nov. 30, 2017

(30) Foreign Application Priority Data

May 27, 2016 (JP) .................. 2016-106351

(51) Int. Cl.
| | |
|---|---|
| *H04R 1/02* | (2006.01) |
| *B60R 11/02* | (2006.01) |
| *B62D 25/08* | (2006.01) |
| *B60R 13/07* | (2006.01) |
| *B60R 11/00* | (2006.01) |

(52) U.S. Cl.
CPC .......... *B60R 11/0217* (2013.01); *B60R 13/07* (2013.01); *B62D 25/081* (2013.01); *H04R 1/021* (2013.01); *H04R 1/025* (2013.01); *B60R 2011/0003* (2013.01); *H04R 2499/13* (2013.01)

(58) Field of Classification Search
CPC ...... H04R 1/025; H04R 1/028; H04R 1/2803; H04R 1/2811; H04R 1/02; H04R 1/026; H04R 1/2826; H04R 31/00; H04R 5/02; H04R 2499/13; B60R 11/0217; B60R 13/07; B60R 2011/0003
See application file for complete search history.

(56) References Cited

U.S. PATENT DOCUMENTS

| | | | |
|---|---|---|---|
| 6,298,943 B1 | 10/2001 | Yamada et al. | |
| 9,025,790 B2 * | 5/2015 | Tada | H04R 1/2803 |
| | | | 381/86 |
| 2013/0188806 A1 | 7/2013 | Tada | |

FOREIGN PATENT DOCUMENTS

| | | |
|---|---|---|
| DE | 102012003772 A1 | 8/2013 |
| EP | 2067691 A2 | 6/2009 |
| EP | 2620328 A1 | 7/2013 |
| JP | 2010179680 A * | 8/2010 |

OTHER PUBLICATIONS

Extended European Search Report for European Application No. 17168634.8, dated Aug. 28, 2017.

* cited by examiner

*Primary Examiner* — Thang Tran
(74) *Attorney, Agent, or Firm* — Brinks Gilson & Lione

(57) ABSTRACT

Forms of a vehicle loudspeaker system may include: a vehicle interior space defined on an inner side of a front windshield, a vehicle exterior storage space defined on a front side of the vehicle interior space such that a partition is disposed between the vehicle exterior storage space and the vehicle interior space, a cowl box disposed between an upper end of the partition and a lower end of the front windshield, and a loudspeaker including a diaphragm. The loudspeaker may be disposed in the cowl box such that sound pressure generated by the diaphragm is emitted to the vehicle interior space.

8 Claims, 3 Drawing Sheets

VEHICLE LOUDSPEAKER SYSTEM

RELATED APPLICATIONS

The present application claims priority to Japanese Patent Appln. No. 2016-106351, filed May 27, 2016, the entire disclosure of which is hereby incorporated by reference.

BACKGROUND

1. Field of the Disclosure

The present disclosure relates to a vehicle loudspeaker system that permits sound pressure emitted from a loudspeaker to be introduced from a front part of a vehicle to a vehicle interior space.

2. Description of the Related Art

Installing a relatively large loudspeaker, such as a subwoofer for low frequencies, in a vehicle interior space reduces an available space in the vehicle interior space. As described in Japanese Unexamined Patent Application Publication No. 2013-176030, a recently developed vehicle loudspeaker system is configured such that a loudspeaker is disposed in an engine compartment defined on a front side of a vehicle interior space and separated from the vehicle interior space by a partition. The loudspeaker generates reproduced sound, which is emitted to the vehicle interior space through an opening in the partition, and antiphase sound pressure, which is opposite in phase to the reproduced sound, generated from the loudspeaker is discharged into a cowl box disposed below and anterior to a front windshield.

A vehicle loudspeaker system with such a configuration permits reproduced sound generated by vibration of a diaphragm of the loudspeaker disposed in the engine compartment to be introduced into the vehicle interior space through the partition. This enables an occupant in a vehicle to hear sound emitted from the loudspeaker as sound coming from the front side of the vehicle interior space. In addition, antiphase sound pressure generated from a rear side of the diaphragm can be prevented from entering the vehicle interior space, thus preventing sound cancellation in the vehicle interior space.

In the related-art vehicle loudspeaker system disclosed in Japanese Unexamined Patent Application Publication No. 2013-176030, however, a temperature of a loudspeaker disposed in the engine compartment may increase due to radiant heat from the engine. Furthermore, an interior of an engine compartment is likely to be exposed to exhaust gas or chemicals, for example, and is also likely to receive vibration. Unfortunately, the loudspeaker may be damaged by chemicals or vibration.

SUMMARY

The present disclosure has been made in view of the above-described circumstances in the art. The present disclosure provides a vehicle loudspeaker system that can reduce or eliminate an increase in temperature of a loudspeaker.

An aspect of the present disclosure provides a vehicle loudspeaker system including a vehicle interior space defined on an inner side of a front windshield, a vehicle exterior storage space defined on a front side of the vehicle interior space such that a partition is disposed between the vehicle exterior storage space and the vehicle interior space, a cowl box disposed between an upper end of the partition and a lower end of the front windshield, and a loudspeaker including a diaphragm. The loudspeaker is disposed in the cowl box such that sound pressure generated by the diaphragm is introduced into the vehicle interior space.

In some implementations of a vehicle loudspeaker system with such a configuration, the loudspeaker is disposed in the cowl box on the front side of the vehicle interior space. The cowl box serves as a water box for receiving rainwater falling from the front windshield and has the effect of reducing conduction of external heat. Consequently, the loudspeaker is less likely to be affected by radiant heat from, for example, an engine in the vehicle exterior storage space. Thus, an increase in temperature of the loudspeaker can be reduced or eliminated. Furthermore, since the cowl box is an unclosed space that does not tend to store solar heat, the structure prevents an increase in a temperature of the loudspeaker caused by solar heat.

In some implementations, the cowl box may include an upper cover and a lower body covered by the upper cover, where the upper cover includes a through-hole through which rainwater falling from the front windshield flows into the cowl box. The loudspeaker may be disposed at a position other than under the through-hole. Such a configuration reduces a likelihood that the loudspeaker may be exposed to, for example, rainwater flowing into the cowl box from the outside. Advantageously, this can prevent the loudspeaker from malfunctioning due to exposure to water.

In some implementations, the cowl box may have a cross-sectional shape diverging upwardly from a bottom surface of the cowl box and the loudspeaker may be mounted in the cowl box such that the diaphragm having a substantially conical shape diverges upwardly. Such a configuration enables the diaphragm having a large area to be received in a limited space within the cowl box, thus allowing the loudspeaker to have an enhanced capability of reproducing low and midrange frequencies.

In some implementations, the loudspeaker includes a frame that holds a peripheral part of the diaphragm, and the frame holds a magnetic circuit located above the diaphragm.

In some implementations, the loudspeaker may include a lower cover that defines an air chamber together with a lower surface of the diaphragm and a duct that projects from an outer circumferential surface of the lower cover and communicates with the air chamber such that sound pressure generated by vibration of the diaphragm is introduced into the vehicle interior space through the duct. Such a configuration allows reproduced sound to be introduced into the vehicle interior space through the duct included in the loudspeaker. This configuration facilitates installation of the loudspeaker in the cowl box and enables the substantially conical diaphragm to be located in upper part of the air chamber, permitting an increase in area of the diaphragm.

In some implementations, the lower cover may have a cross-sectional shape diverging upwardly from a bottom surface of the lower cover. Since the lower cover has a cross-sectional shape similar to that of the cowl box, the loudspeaker having a large size can be disposed in the cowl box with space efficiency.

In some implementations, the frame may include exhaust portions that communicate with a space on an upper surface (rear side) of the diaphragm such that antiphase sound pressure generated by vibration of the diaphragm is discharged into the cowl box through the exhaust portions. Such a configuration prevents antiphase sound pressure generated from the rear side of the diaphragm from entering the vehicle interior space, thus preventing sound cancellation in the vehicle interior space.

Since the loudspeaker is installed in the cowl box for receiving rainwater falling from the front windshield, a vehicle loudspeaker system according to forms of the present disclosure enable an occupant in a vehicle to hear reproduced sound emitted from the loudspeaker as sound coming from the front side of the vehicle interior space, and can reduce or eliminate an increase in temperature of the loudspeaker.

DETAILED DESCRIPTION OF THE DRAWINGS

Figure 1:
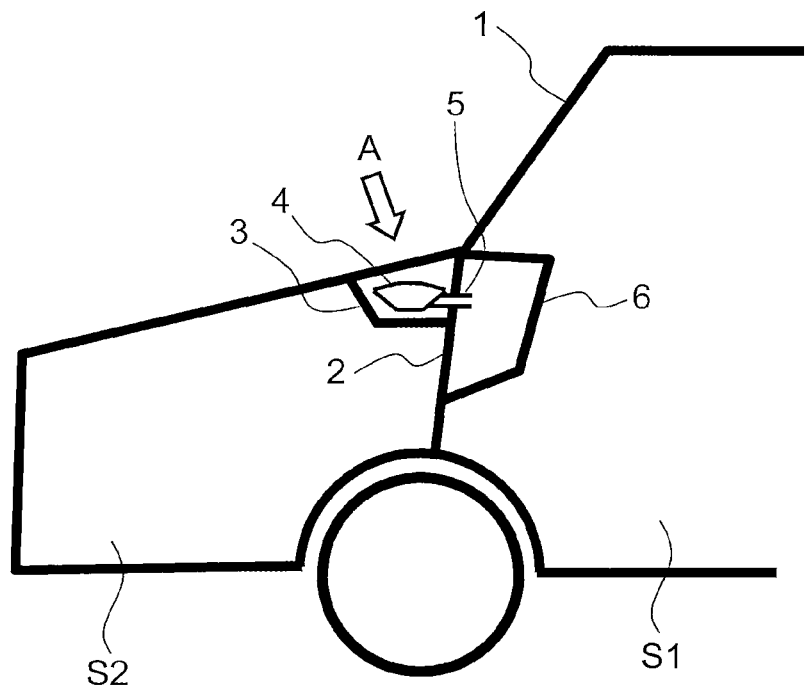
FIG. 1 is a schematic diagram of one form of a vehicle loudspeaker system.

Forms of the present disclosure will be described below with reference to the drawings. As illustrated in FIG. 1, a motor vehicle that includes a vehicle loudspeaker system according to forms of the present disclosure has a vehicle interior space S1 defined on an inner side of a front windshield 1 and a vehicle exterior storage space (engine compartment) S2 disposed on a front side of the vehicle interior space S1 such that the vehicle interior space S1 is separated from the vehicle exterior storage space S2 by a partition 2. A cowl box 3 is disposed between an upper end of the partition 2 and a lower end of the front windshield 1. The cowl box 3 accommodates a loudspeaker 4. As will be described in detail later, the loudspeaker 4 includes a duct 5. The duct 5 extends through the cowl box 3 to a rear side of an instrument panel 6 disposed in front part of the vehicle interior space S1.

Figure 2:
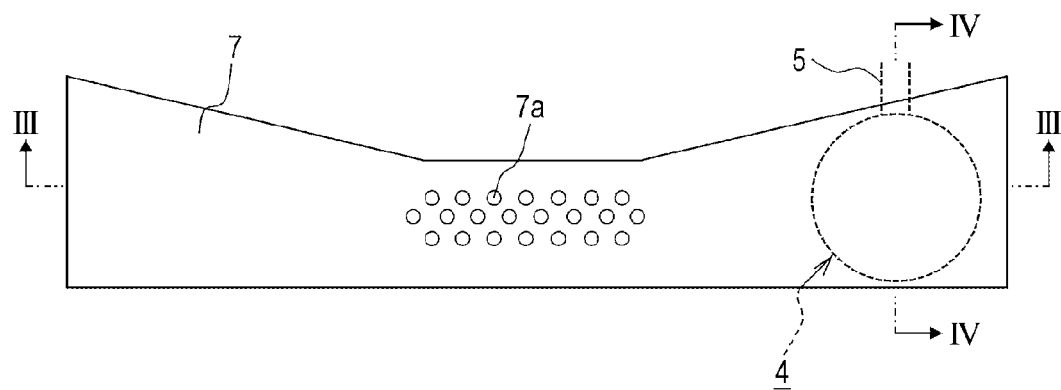
FIG. 2 is a plan view of the system as viewed in the direction of the arrow A in FIG. 1.
Figure 3:
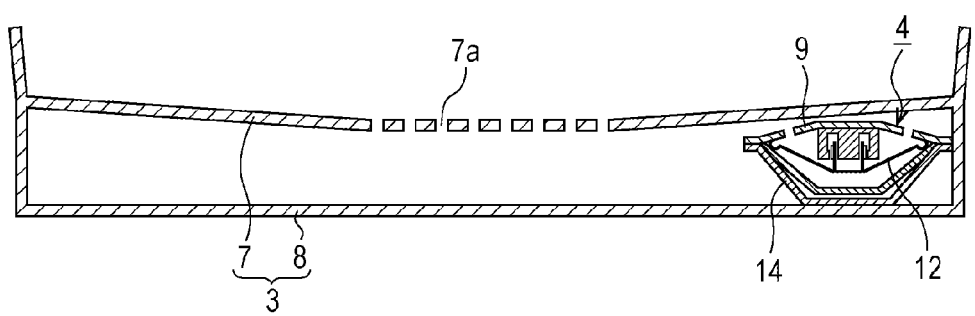
FIG. 3 is a longitudinal sectional view of the system taken along the line III-III in FIG. 2.
Figure 4:
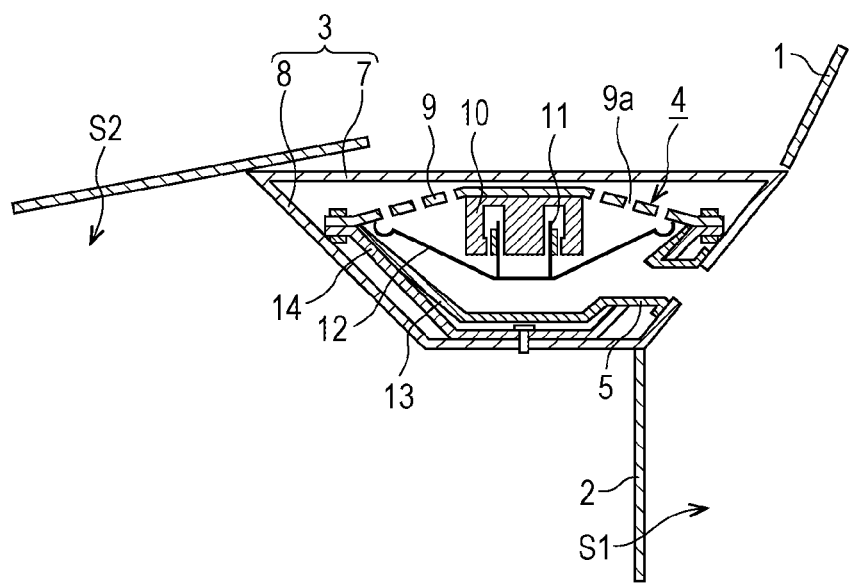
FIG. 4 is an enlarged cross-sectional view of the system taken along the line IV-IV in FIG. 2.

The cowl box 3 serves as a water box for receiving rainwater falling from the front windshield 1. The cowl box 3 accommodates a motor (not illustrated) for driving wipers. As illustrated in FIGS. 2 to 4, the cowl box 3 includes an upper cover 7 having through-holes 7a, through which rainwater falling from the front windshield 1 flows into the cowl box 3, and a lower body 8 covered by the upper cover 7. The lower body 8 has a drain outlet (not illustrated) through which, for example, received rainwater is drained out of the vehicle.

The upper cover 7 is a plate-like member extending laterally along the width of the front windshield 1. As illustrated in FIG. 3, the upper cover 7 slightly slopes toward its central part in which the through-holes 7a are arranged. The loudspeaker 4 is disposed at a position other than under the through-holes 7a. In the some implementations, the loudspeaker 4 is disposed adjacent to one end of the upper cover 7 in the width direction thereof on a rear side of the upper cover 7.

As illustrated in FIG. 4, the lower body 8 has a cross-sectional shape diverging upwardly from its bottom surface, or an inverted trapezoidal cross-sectional shape. The lower body 8 separates the cowl box 3 from the vehicle exterior storage space S2.

The configuration of the loudspeaker 4 will now be described. As illustrated in FIG. 4, the loudspeaker 4 includes a frame 9 having a substantially downwardly diverging cross-sectional shape, a magnetic circuit 10 fixed to central part of a lower surface of the frame 9, a voice coil 11 disposed in a magnetic gap of the magnetic circuit 10 and driven by electromagnetic interaction when energized, a substantially conical diaphragm 12 vibrating in conjunction with the voice coil 11, a lower cover 13 covering a lower surface of the diaphragm 12, and the duct 5 extending from an outer circumferential surface of the lower cover 13.

The frame 9 has through-holes 9a, serving as exhaust portions. The frame 9 holds a peripheral part of the diaphragm 12. The lower cover 13 has a cross-sectional shape diverging upwardly from its bottom surface. An upper end of the lower cover 13 is fastened to the frame 9. The lower cover 13 and the lower surface of the diaphragm 12 define an air chamber (space), which connects to one end of the duct 5. In this implementation, the through-holes 9a serve as exhaust portions. In some implementations, the frame 9 includes radially extending spokes, where each space between two adjacent spokes serves as an exhaust portion.

The loudspeaker 4 with this configuration is fixed to the bottom surface of the lower body 8 of the cowl box 3 by attachment fittings 14. Furthermore, the loudspeaker 4 communicates with the vehicle interior space S1 via the duct 5 extending through a side wall of the lower body 8. Since the diaphragm 12 having a substantially conical shape is disposed in the cowl box 3 such that the diaphragm 12 upwardly diverges, the peripheral part, or edge of the diaphragm 12 can be disposed in as wide a part of the cowl box 3 as possible. In addition, since the lower cover 13 has a cross-sectional shape similar to that of the lower body 8, the diaphragm 12 having a large area can be received in a limited space within the cowl box 3.

In forms of the vehicle loudspeaker system, when current flows through the voice coil 11, the voice coil 11 is driven due to known electromagnetic interaction, so that the diaphragm 12 drivingly connected with the voice coil 11 vibrates its surrounding air. Reproduced sound generated by the vibration passes from the air chamber on the lower surface of the diaphragm 12 through the duct 5 and is emitted to the vehicle interior space S1. Consequently, an occupant in the vehicle can hear the reproduced sound emitted from the rear side of the instrument panel 6 disposed in the front part of the vehicle interior space. At this time, antiphase sound pressure generated from an upper surface (rear side) of the diaphragm 12 is discharged into the cowl box 3 through the through-holes 9a of the frame 9. The cowl box 3, which is an unclosed space communicating with the outside of the vehicle, prevents the antiphase sound pressure generated from the rear side of the diaphragm 12 from entering the vehicle interior space S1, thus preventing sound cancellation in the vehicle interior space S1. This can prevent a reduction in sound pressure in the vehicle interior space S1 as well as a degradation in sound quality.

As described above, in forms of the vehicle loudspeaker system, the loudspeaker 4 is disposed in the cowl box 3 located on the front side of the vehicle interior space S1. The cowl box 3, serving as a water box for receiving rainwater falling from the front windshield 1, has the effect of reducing conduction of external heat. Consequently, the loudspeaker 4 is less likely to be affected by radiant heat from the engine in the vehicle exterior storage space S2. Thus, an increase in temperature of the loudspeaker 4 can be reduced or eliminated. In addition, since the cowl box 3 is the unclosed space that does not tend to store solar heat, an increase in temperature of the loudspeaker 4 caused by solar heat can also be prevented. Furthermore, since the loudspeaker 4 can be firmly fixed in the cowl box 3, vibration acting on the loudspeaker 4 can be reduced.

The cowl box 3 includes the upper cover 7 having the through-holes 7a, through which the rainwater falling from the front windshield 1 flows into the cowl box 3, and the lower body 8 covered by the upper cover 7. The loudspeaker 4 is disposed at a position other than under the through-holes 7a. This arrangement greatly reduces a likelihood that the loudspeaker 4 may be exposed to, for example, rainwater flowing into the cowl box 3 through the through-holes 7a. This can prevent the loudspeaker 4 from malfunctioning due to exposure to water.

The cowl box 3 has a cross-sectional shape diverging upwardly from the bottom surface. The loudspeaker 4 is disposed in the cowl box 3 having such a shape in such a manner that the diaphragm 12 of the loudspeaker 4 upwardly diverges. Thus, the edge of the diaphragm 12 can be disposed in as wide a part of the cowl box 3 as possible. Consequently, the diaphragm 12 having a large area can be received in the limited space within the cowl box 3. The loudspeaker (woofer) 4 with an enhanced capability of reproducing low and midrange frequencies can be disposed in the cowl box 3.

The loudspeaker 4 includes the lower cover 13 that defines the air chamber together with the lower surface of the diaphragm 12 and the duct 5 that communicates with the air chamber and projects from the outer circumferential surface of the lower cover 13, such that sound pressure generated by vibration of the diaphragm 12 is introduced into the vehicle interior space S1 through the duct 5. This configuration facilitates installation of the loudspeaker 4 in the cowl box 3. Additionally, the configuration enables the substantially conical diaphragm 12 to be located in upper part of the air chamber, permitting an increase in area of the diaphragm 12. Furthermore, since the lower cover 13 has a cross-sectional shape diverging upwardly from the bottom surface and this cross-sectional shape is similar to that of the cowl box 3, the loudspeaker 4 having a large size can be disposed in the cowl box 3 with space efficiency. Although the diaphragm 12 is substantially conical in the present implementation, the diaphragm 12 may have any other shape. The diaphragm 12 may have a three-dimensional oval or racetrack-like shape.

The frame 9 of the loudspeaker 4 has the through-holes 9a, serving as exhaust portions, such that antiphase sound pressure generated by vibration of the diaphragm 12 is discharged into the cowl box 3 through the through-holes 9a. This prevents the antiphase sound pressure generated from the rear side of the diaphragm 12 from entering the vehicle interior space S1, thus preventing sound cancellation in the vehicle interior space S1.

Figure 5:
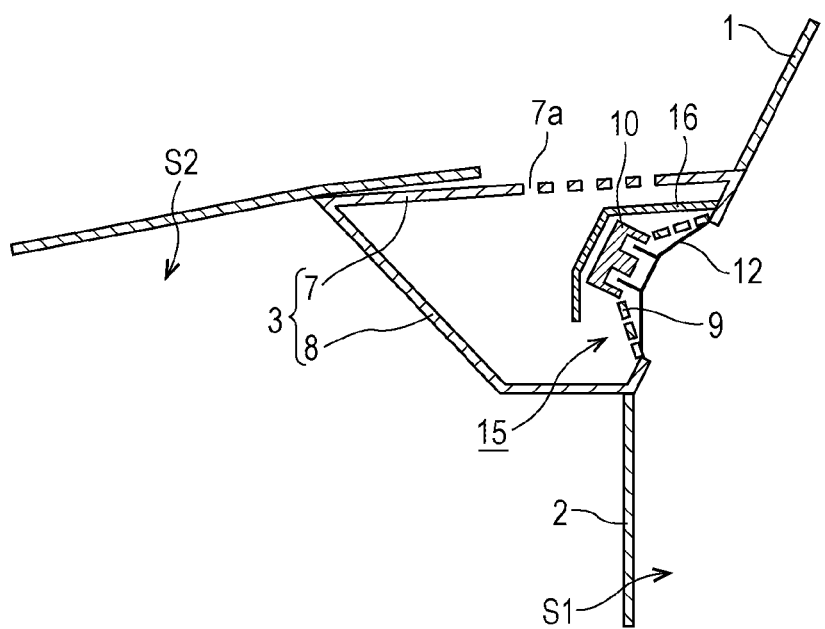
FIG. 5 is a sectional view of essential part of another form of a vehicle loudspeaker system.

FIG. 5 is a cross-sectional view of essential part of another form of a vehicle loudspeaker system. The same components as those of the system illustrated in FIGS. 1 to 4 are designated by the same reference numerals.

In the implementation of FIG. 5, the frame 9 of a loudspeaker 15 is attached to the side wall of the lower body 8 of the cowl box 3 such that reproduced sound generated by vibration of the diaphragm 12 is directly emitted to the vehicle interior space S1 without passing through any duct. Furthermore, the system includes a rainproof cover 16 for covering the loudspeaker 15. The rainproof cover 16 is mounted in the cowl box 3 so that if the loudspeaker 15 is disposed at a position close to the through-holes 7a of the upper cover 7, the loudspeaker 15 can be prevented from being exposed to rainwater.

In the vehicle loudspeaker system with such a configuration, the loudspeaker 15 is installed in the cowl box 3 located on the front side of the vehicle interior space S1 in a manner similar to the foregoing implementation. Since the cowl box 3 has the effect of reducing conduction of external heat, the loudspeaker 15 is less likely to be affected by radiant heat from the engine in the vehicle exterior storage space S2. Thus, an increase in temperature of the loudspeaker 15 can be reduced or eliminated.

It is therefore intended that the foregoing detailed description be regarded as illustrative rather than limiting, and that it be understood that it is the following claims, including all equivalents, that are intended to define the spirit and scope of this invention.

What is claimed is:

1. A vehicle loudspeaker system comprising:
a vehicle interior space defined on an inner side of a front windshield;
a vehicle exterior storage space defined on a front side of the vehicle interior space such that a partition is disposed between the vehicle exterior storage space and the vehicle interior space;
a cowl box configured to receive rainwater from the front windshield, the cowl box configured to accommodate a motor for driving a windshield wiper and disposed between an upper end of the partition and a lower end of the front windshield; and
a loudspeaker including a diaphragm,
wherein the loudspeaker is disposed in the cowl box such that sound pressure generated by the diaphragm is introduced into the vehicle interior space.

2. The system according to claim 1,
wherein the cowl box includes an upper cover and a lower body covered by the upper cover, the upper cover having a through-hole configured to receive rainwater from the front windshield and allow the rainwater to flow into the cowl box, and
wherein the loudspeaker is disposed at a position other than under the through-hole.

3. The system according to claim 1,
wherein the cowl box has a cross-sectional shape diverging upwardly from a bottom surface of the cowl box, and
wherein the loudspeaker is mounted in the cowl box such that the diaphragm has a substantially conical shape that diverges upwardly.

4. The system according to claim 3,
wherein the loudspeaker includes a frame that holds a peripheral part of the diaphragm, and
wherein the frame holds a magnetic circuit located above the diaphragm.

5. The system according to claim 4, wherein the loudspeaker comprises:
a lower cover that defines an air chamber together with a lower surface of the diaphragm, and
a duct that projects from an outer circumferential surface of the lower cover and communicates with the air chamber such that sound pressure generated by vibration of the diaphragm is introduced into the vehicle interior space through the duct.

6. The system according to claim 5, wherein the lower cover has a cross-sectional shape diverging upwardly from a bottom surface of the lower cover.

7. The system according to claim 4, wherein the frame includes exhaust portions that communicate with a space on an upper surface of the diaphragm such that antiphase sound pressure generated by vibration of the diaphragm is discharged into the cowl box through the exhaust portions.

8. A vehicle loudspeaker system comprising:
- a vehicle interior space defined on an inner side of a front windshield;
- a vehicle exterior storage space defined on a front side of the vehicle interior space such that a partition is disposed between the vehicle exterior storage space and the vehicle interior space;
- a cowl box disposed between an upper end of the partition and a lower end of the front windshield; and
- a loudspeaker including a diaphragm,
- wherein the loudspeaker is disposed in the cowl box such that sound pressure generated by the diaphragm is introduced into the vehicle interior space without passing through a duct.

* * * * *